Jan. 23, 1940. H. SCHICHT 2,188,016
TOOL DRESSING APPARATUS FOR BEVEL GEAR GENERATING MACHINES
Filed Feb. 23, 1937 4 Sheets-Sheet 1

Inventor:
Heinrich Schicht
By Dodge and Ostn
Attorneys

Inventor:
Heinrich Schicht
By Dodge and ...
Attorneys

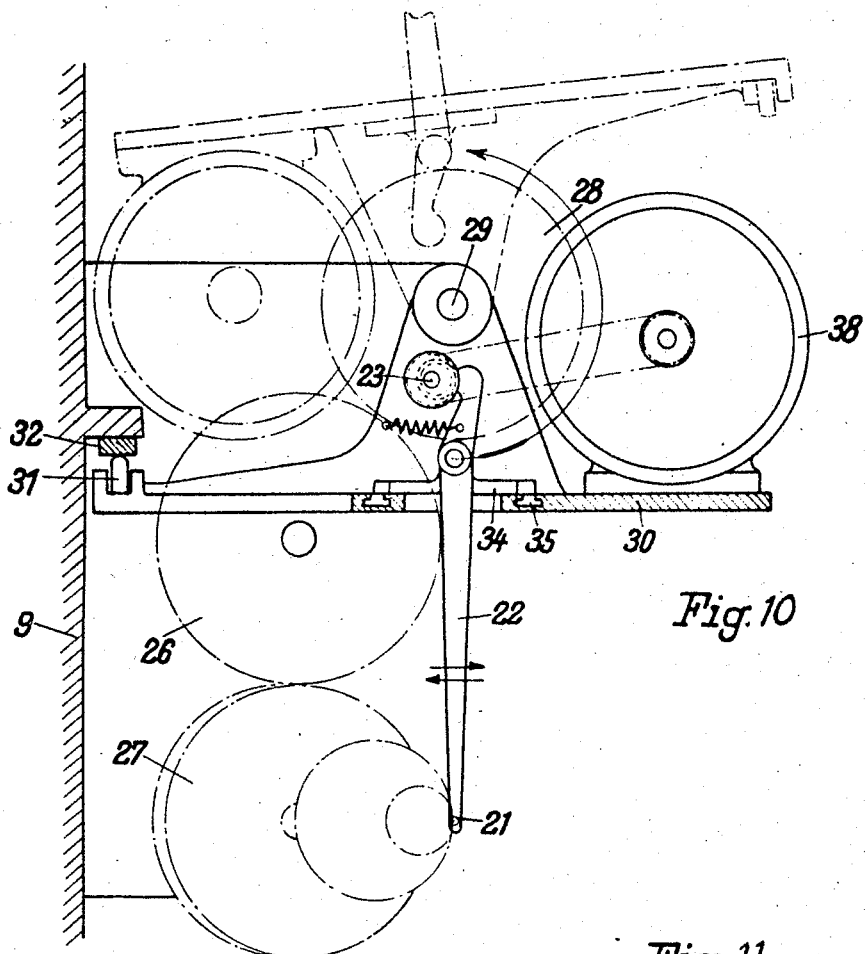
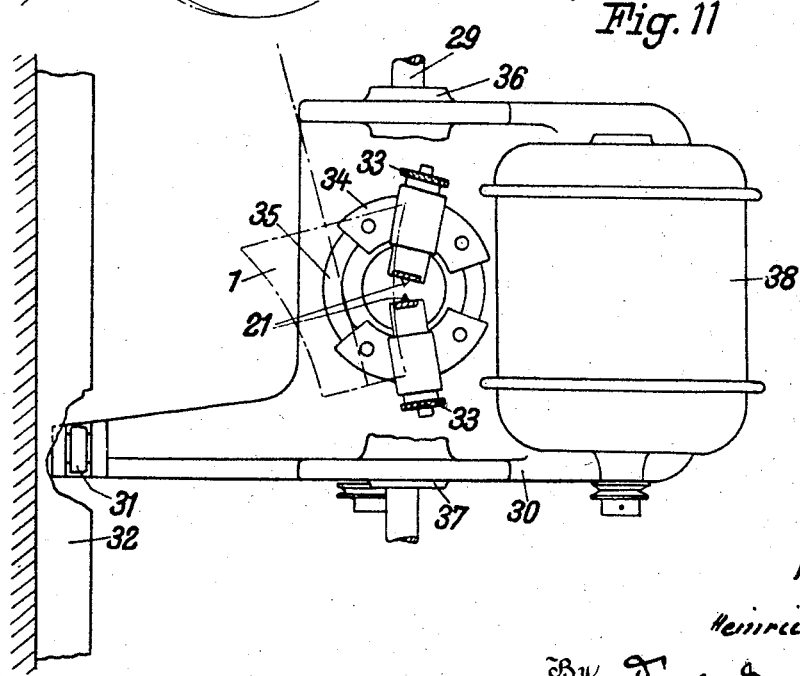

Patented Jan. 23, 1940

2,188,016

UNITED STATES PATENT OFFICE 2,188,016

TOOL DRESSING APPARATUS FOR BEVEL GEAR GENERATING MACHINES

Heinrich Schicht, Huckeswagen, Germany, assignor to the firm: W. Ferd. Klingelnberg Söhne, Remscheid-Berghausen, Germany Application February 23, 1937, Serial No. 127,218 In Germany February 25, 1936

7 Claims. (Cl. 125—11)

This invention relates to apparatus for generating gear teeth and more particularly to apparatus for trimming gear cutting tools made up of abrasive material, and adapted to generate tooth flanks and bevel gears of the type having longitudinally curved teeth, as shown in Patent Number 2,037,930, granted April 23, 1936.

It is known in the art to subject the cutting tool to two movements during generating movement, namely (1) a rectilinear movement of the tool along its axis as the tool engages the blank and (2) an oscillating movement of the tool about the center of the crown gear as an axis. The first movement is executed several times during the generation of the blank.

Practice of the above method results in a burnishing of the tooth flanks generated, and since the rectilinear movement of the tool produces an overlap in the areas over which each individual tooth travels during generating, the formation of a scaly surface is avoided.

The improvement covered by this invention consists in the use of a special tool in the form of a finely toothed worm or hob formed of abrasive grains embedded in a suitable matrix as indicated in the drawings, and adapted to burnish the tooth flanks generated. This tool is oscillated about the crown gear axis several times during the generation of the blank. The advantages of this are that (1) the number of effective cutting points is considerably increased, hence a burnish sufficient to meet all requirements is attained, and (2) the motions produced result in obtaining a sufficiently rapid relief of the zones where the tool comes in contact. The latter advantage is obtained in spite of the unavoidable dependency of the various movements in the generation of a bevel gear by the rolling generating process, and it cannot be obtained by repeated rectilinear displacement.

According to this invention apparatus is provided for carrying out this new method. The apparatus consists of means in the form of a reversing gear which moves the face plate upon which the tool head is mounted, and simultaneously operates a differential gear in the transmission from the tool to the blank. This apparatus preferably includes a tool in the form of a conical or hyperbolic grinding worm having its bearing displaceable in the direction of the tool axis by suitable adjusting apparatus, and also making the bearing rotatable about the tool axis.

This mechanism can operate to feed the tool to the blank, in contrast to the usual bevel gear generating machine in which this feeding is accomplished by oscillating the face plate. It can also be used to compensate for the decrease in worm diameter produced by wear. In order to produce radial adjustment only, of the effective tracks of the threads and to prevent axial displacement with respect to the imaginary crown gear, it is preferable to combine the two adjusting movements, and to produce the feed by screwing the tool axis. In this way the pitch of the spindle which runs parallel to the tool axis and which actuates the feed, has to be brought into accord with the mantle line pitch.

When trimming the grinding worms or hobs according to this invention, the method may be carried out to advantage by moving the trimming tools, diamonds for example, back and forth rapidly on the flanks of the worm threads transverse to the direction of rotation. This motion causes the trimming tools to describe, on the tooth flanks, diagonal paths which intersect at an angle during repeated rotation.

The method of trimming the grinding worms is executed to advantage in such a manner that in the case of the one worm, destined for generating a pair of gears the two flanks coordinate to a tooth, are contacted by the trimming tools, and in the case of the other worm, the two flanks coordinate to a space, are contacted simultaneously.

This method of generation even makes it possible to depart from the usual rectilineal tooth profile employed, on account of the simple method of production, and to develop worms with inwardly or outwardly curved flanks.

In generating worms having curved mantle lines as well as those having straight mantle lines it is preferred to arrange the casings which carry the trimming tools so that they oscillate about an axis running in the direction of feed, and also to provide these casings with cylindrical guides and to support them for variable oscillatory movement on a stationary standard. In this way, for instance, worms used in generating "Palloid" curves can be trimmed with great accuracy. Gears of this type are described in the patent mentioned above.

Several embodiments of the invention are illustrated in the drawings in which:

Fig. 10 is a side view of the apparatus of Fig. 8, but including the driving motor and tool guides; and Fig. 11 is a plan view of the apparatus shown in Fig. 10 with the tools in working position.

Figure 1:
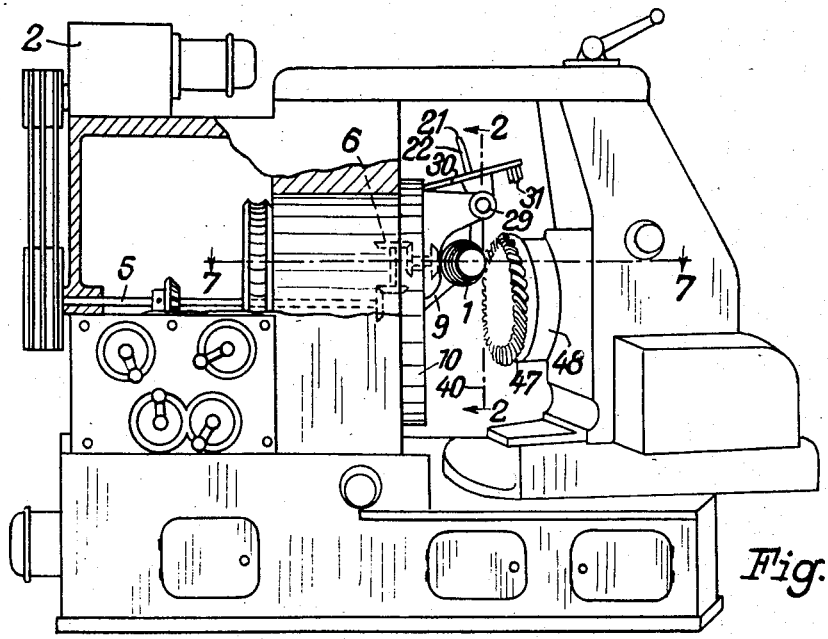
Fig. 1 is a side view of a gear generating machine equipped with a trimming device embodying the invention, the trimming device being shown in its rest position.
Figure 6:
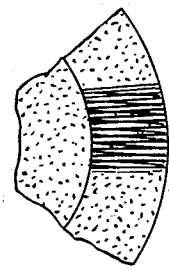
Fig. 6 is a diagrammatic view showing the paths described by a trimming tool embodying the invention, as it travels over the tool during a trimming operation.
Figure 3:
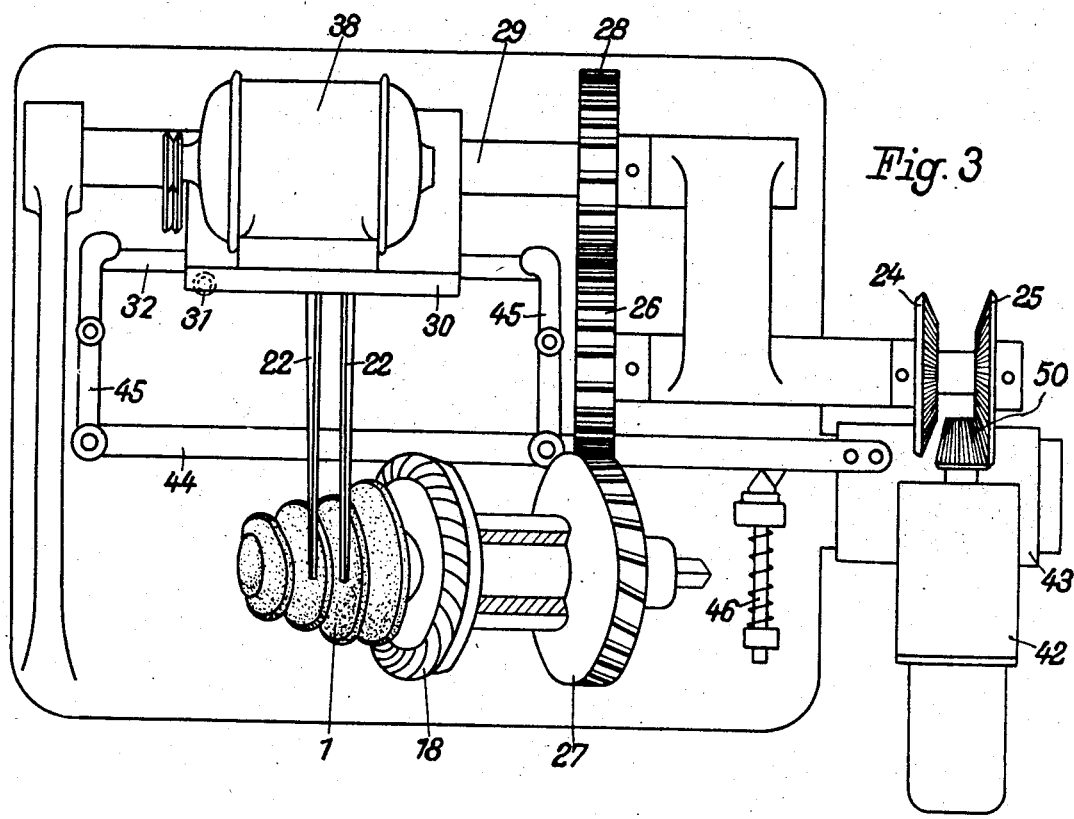
Fig. 3 is a plan view on an enlarged scale of the trimming device shown in Fig. 2.

In Fig. 1 of the drawings, 1 indicates a tool made of abrasive material held in a suitable matrix or binder as indicated in Fig. 6 of the drawings. This tool may be driven in any suitable manner as, for example, by a motor 2 through a drive including a shaft 5 and bevel gearing 6. The gear blank indicated 47 is mounted on a suitable support 48 which may be driven in any conventional manner from the motor 2, for example, by means such as are disclosed in my Patent No. 2,037,930, granted April 23, 1936.

Inasmuch as the particular means employed for driving the tool and the blank are not important, the details will not be described except to indicate that the face plate 10 carrying the tool head 9 may be subjected to oscillatory movement and properly coordinated with the rotation of the tool 1 and the actuation of the blank 47 substantially as described in the above patent.

While the particular machine shown is used in generating spiral bevel gears by a rolling generating process, and it is in such mechanism that the present invention finds its greatest application, it is not intended that the use of the invention shall be limited to this particular field. For the purpose of giving ready understanding of the invention, important features of the cooperating parts in the machine will be described functionally.

In the examples described, the tool is not at once adjusted to full depth of cut, but is advanced gradually. This feed may be carried out according to special requirements either by displacement of the tool or of the bevel gear. Hence, the oscillatory movement, with the necessary rotational cutting movement, is not so important for displacing the tool toward the blank, as it is in preventing the tool and blank from remaining in cutting contact for too long a time. This is important because with a tool of the character used herein and having a large number of small abrasive cutting points there would be either a prohibitive heating or a rapid blunting of the sensitive cutting points. The relieving of the effective surface of the tool in its oscillating movement with respect to the bevel gear appears as a tooth depth motion.

Figure 7:
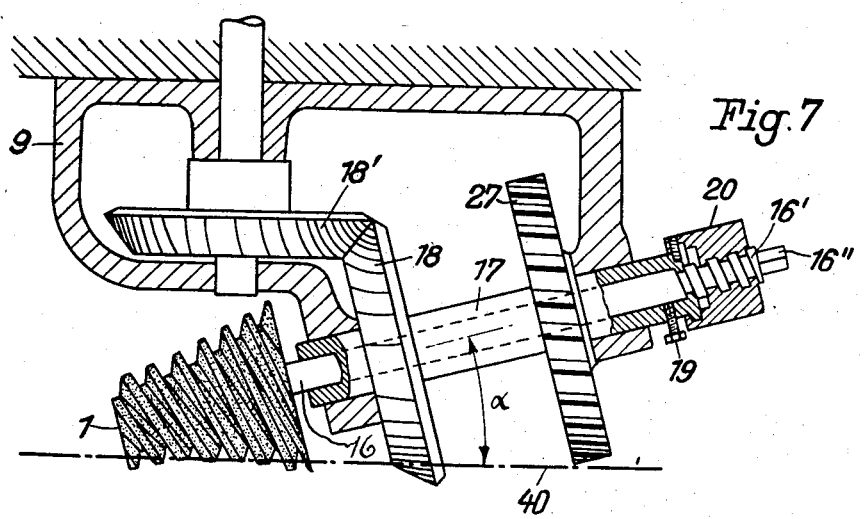
Fig. 7 is a partial section on line 7—7 of Fig. 1, showing a portion of a tool head embodying the invention.

In the apparatus shown in Fig. 7 the tool 1 is in the form of a hyperbolic worm or hob. The shaft 16 of the worm is mounted in a quill shaft 17, this shaft 17 being rotatable through bevel gears 18, 18'. The shaft 16 and quill shaft 17 may be connected and disconnected by a set screw 19.

The end of shaft 16 remote from the tool is threaded at 16' and terminates in a square head 16" adapted to receive a spanner wrench. The threaded portion 16' of shaft 16 cooperates with a nut 20 which is secured to the shaft 17. The thread 16' on shaft 16 is of smaller pitch than the mantle line pitch of the tool 1. The pitch of 16' is so designed that it equals the mantle pitch of the tool multiplied by the cosine of the angle $a$ formed by the tool axis and its mantle line.

With this pitch ratio it is possible by loosening set screw 19 and rotating shaft 16, to cause the parts of the threads lying in the plane of the crown gear to change their position as measured at right angles to the crown gear, but avoiding displacement parallel to the plane of the crown gear. In other words, this adjustment increases the effective diameter of the tool. Consequently, the threads can be brought into contact with the work by this adjustment when the tool has become worn and its diameter decreased. After an adjustment is made, the set screw 19 is again tightened.

The adjusting apparatus just described can also be used to feed the tool threads lying in the plane of the crown gear toward the crown gear. In performing this feeding, it is advisable to operate the shaft 16 automatically, for example after each oscillation of the face plate.

If the spiral tool of the machine is a grinding worm, the machine may to advantage be provided with a trimming apparatus such as illustrated in Figs. 8 to 11 for working the tooth flanks.

Figure 8:
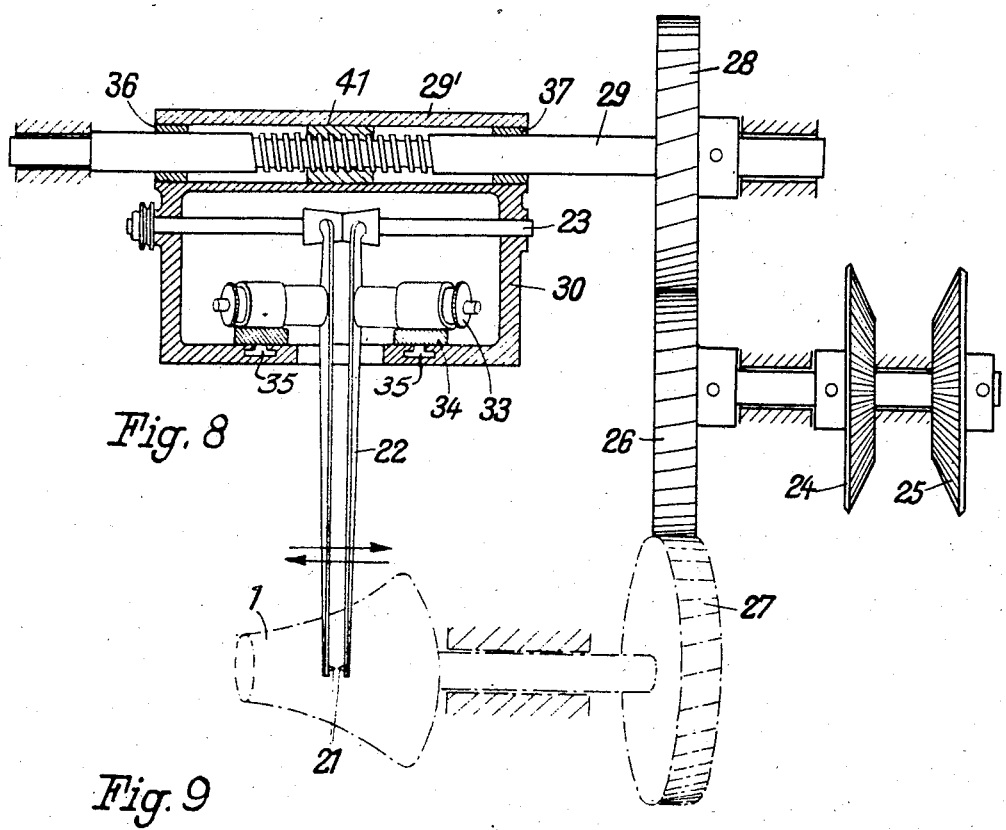
Fig. 8 is a view, partly sectional and partly diagrammatic, showing the details of the tool carrier of the present invention.
Figure 9:
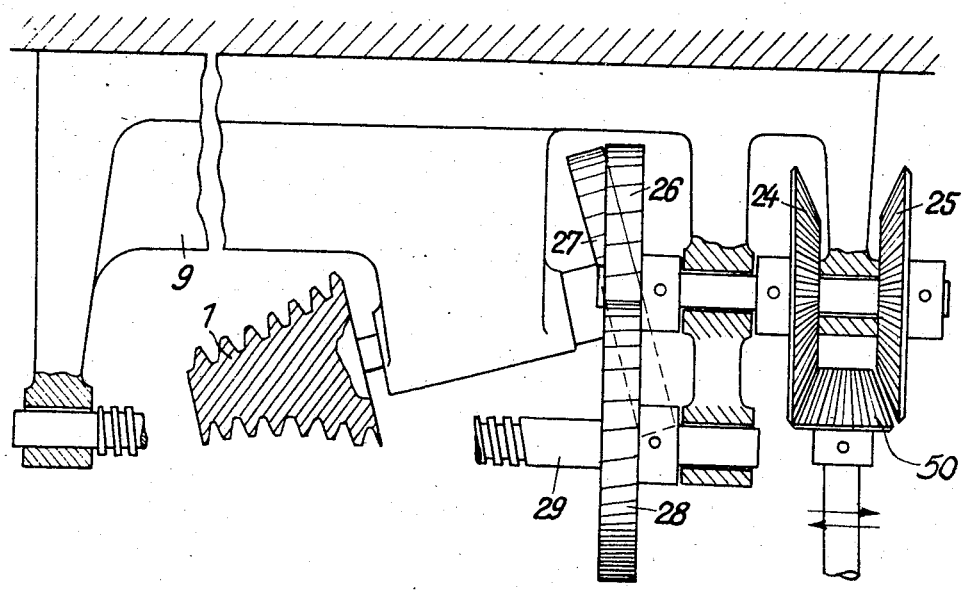
Fig. 9 is a plan view of the apparatus shown in Fig. 8 with a portion of the trimming device removed.

As shown in Fig. 8, the trimming apparatus is provided with two trimming tools such as diamonds 21. These tools are fixed on slides or on reciprocating levers 22 as shown, and are applied at the points where the grinding worm engages the work during the latter part of the generating of the bevel gear. These points are in the plane of the crown gear. This means is effective in preventing defects which might arise from inaccuracies in the driving mechanism.

Oscillatory movement is imparted to the trimming tools 21 through an eccentric shaft 23, driven by a motor 38. The angle of oscillation is so chosen that the tools or diamonds 21 contact with the tooth flanks throughout their entire depth. While the trimming tools are executing this movement, the grinding worm 1, which is disengaged from the machine drive during the trimming, is set in rotation by reversing gears 24, 25, and 50 through gears 26 and 27. At the same time a spindle 29 is rotated by 28 which meshes with gear 26.

Movably mounted on spindle 29 is a casing 30 which carries the trimming tools 21, and the central portion of spindle 29 is threaded at 29'. This threaded portion cooperates with a nut 41 carried by casing 30 to cause rectilinear displacement of this casing in a direction parallel to the plane of the crown gear.

The spindle 29, as well as the pivot axis of levers 22, lies approximately in the plane of the crown gear indicated by reference character 40. Consequently, the trimming tools can be moved radially to the grinding worm in all positions of the trimming apparatus with sufficient accuracy to produce straight profiled tooth flanks. If the axis of rotation of the levers is displaced from the crown gear plane, the trimming tools 21 will oscillate more or less tangentially to the circles described about the cutter axis and generate curved flanks.

The speed of displacement of casing 30 on spindle 29 is so determined that the trimming tools remain in regular contact with the flanks of the rotating worm during the displacement. After the trimming tools have run through the threads of the cutting tools in one direction of rotation, the reversing gear 24, 25, 46 is reversed by suitable mechanism, preferably operated hydraulically, so that the worm and spindle, and also the casing 30 move in the opposite direction until the direction of motion is again changed when the end of the worm is reached.

The mounting of the trimming casing 30 will be understood from the showing of Figs. 10 and 11. This casing is supported by an anti-friction roller 31 running on a guide 32 parallel to spindle 29. Guide 32 is fixed to the machine standard or to the tool head. The weight of the casing 30 or of the motor 38 is sufficient to hold the roller 31 in aligning contact with the guide 32, although, if desired or necessary, the pressure can be increased by either springs or weights.

The guide 32 is so mounted that it may be replaced. If a rectilinear guide is used, the trimming tools produce a worm with straight mantle lines, but a suitably curved guide may be used to produce worms with curved mantle lines, e. g., a hyperbolic worm or hob. By changing guides, it is possible to impart to the worm for generating one gear of a pair, a mantle line curve different from that used in generating the mating gear. In this way, variable longitudinally curved flanks are generated for both gears.

Figure 2:
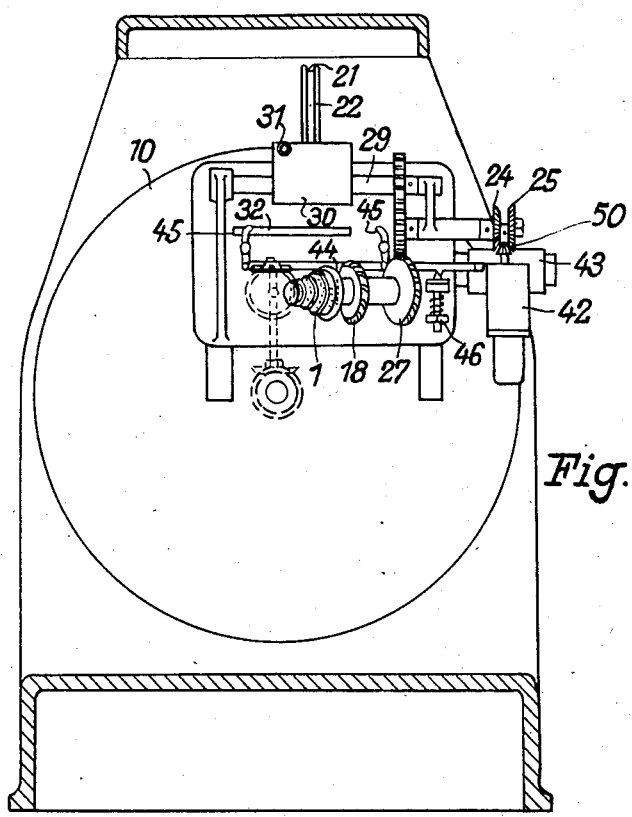
Fig. 2 is a vertical section on line 2—2 of Fig. 1.

Adjustment of the reciprocating lever 22 to agree with the thickness of tooth to be generated, is performed by the mechanism designated 33 in Fig. 11. Turning of the nuts effects a displacement of the levers in the direction of their axes of reciprocation, and for flank angle being produced, by oscillating the lever bearings 34 over the circular path 35. As shown in Figs. 2 and 7, the crown gear plane is designated 40 in order to point out how the trimming takes place in that plane. In Fig. 2, reference character 50 designates the driving means for the gears 24 and 25 which actuate the spindle 29. The support for the driving means 42 is designated 43 and it is connected by rod 44 to the levers 45 which actuate the casing 30 within which the trimming tools are supported and mounted. The means for holding the rod 44 in its adjusted position is designated 46.

Figure 4:
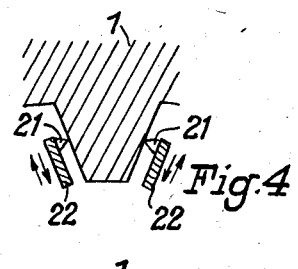
Fig. 4 is a fragmentary view showing the trimming tools operating upon the two flanks coordinate to a worm tooth having straight flanks.
Figure 5:
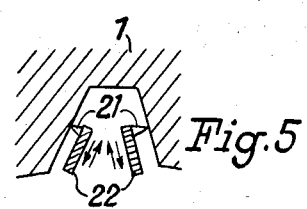
Fig. 5 is a view similar to Fig. 4, but showing two flanks coordinate to a space, in contact with the trimming tools.

The trimming apparatus is designed to permit, if desired, contacting of the two trimming tools 21 simultaneously with the flanks coordinate to a tooth as shown in Fig. 4, or simultaneously with the flanks coordinate to a space as shown in Fig. 5. In generating curved tooth profiles curved guides will, of course, be employed.

It will be evident that the oscillatory movement of the trimming tools is considerably more rapid than the speed of rotation of the worm, consequently, the cutting points 21 describe on the surface of the worm, diagonal paths which during the rapid movement intersect one another at an angle as shown diagrammatically in Fig. 6. This method of trimming is especially advantageous for generating a smooth tooth profile.

As shown in Fig. 11, the trimming apparatus in each working position rests on three supports only, that is, on the guides 36 and 37 on the outside of casing 30 and on the roller 31. This three point suspension gives rigid support and insures faultless trimming of the grinding worm. It is to be understood that in the drawings the various parts of the trimming apparatus are largely diagrammatically shown, and hence, in practice, any suitable supporting mechanism may be provided for the trimming tool to prevent undesirable bending or lateral deflection.

After a trimming operation has been completed, the apparatus may be rotated about the guide spindle 29 as an axis, until it takes up the position of rest shown in dot and dash lines in Fig. 10. The apparatus then remains in the rest position during the generating of the bevel gear blank, or until it is again swung into the full-line working position after wear on the hob has occurred. After a trimming operation, the worm drive is again connected up to the machine drive.

It will be understood that the invention is not limited to the details illustrated, and various changes may be made within the scope of the invention. It will be obvious, e. g., that the trimming tools may be arranged outside of the crown gear plane if less accurate work is to be performed. Such an arrangement, while less accurate, offers the advantage that oscillating of the whole trimming apparatus may be avoided, and, furthermore, tools having a cylindrical pitch mantle can be employed. Numerous other modifications may be made within the scope of the invention.

What is claimed is:

1. Trimming apparatus for abrasive hobs of the conical type employed in generating bevel gears by a rolling generating movement, comprising a frame; a movable grinding hob mounted thereon; a spindle mounted on said frame; a casing mounted for reciprocatory movement on said spindle; a trimming tool mounted on said casing to oscillate about the axis of said spindle; means for actuating said spindle to cause said tool to move back and forth across the flanks of the thread of said hob in a direction oblique to its direction of rotation; and means for swinging said tool into and out of engagement with the cutting flanks of said hob.

2. Trimming apparatus for hobs of abrasive material having a threaded conical surface and of the type employed in generating bevel gears by a rolling generating movement, comprising a frame; a movable hob mounted thereon; a threaded spindle mounted in said frame; a trimmer casing in threaded relation to said spindle; a trimming tool carried by said casing and having a pair of cutting points depending for simultaneous engagement with two hob thread flanks to be trimmed; means for supporting said trimming tool at three spaced points; means for oscillating said tool to cause movement of the cutting points across the thread flanks to be trimmed; and mounting means for the trimming tool constructed and arranged to permit the tool to be swung into either of two positions, one of said positions being with the cutting points disposed away from the hob and the other with the cutting points in engagement with two thread flanks on the hob.

3. A machine for trimming tapered hobs composed of abrasive material and of the type used in generating bevel gears by a rolling generating movement, comprising a support; a toothed hob rotatably carried in said support; a trimming tool mounted in operative relation to said hob;

means comprising a plurality of levers for holding the trimming tool against the hob tooth flanks to be trimmed; means for adjusting the path of movement of the levers in accordance with the flank angle to be trimmed; means for adjusting said tools in accordance with the thickness of the teeth to be trimmed; means for subjecting the tools to oscillatory movement to cause movement of the trimming tool diagonally across the flanks to be trimmed; and mounting means for the trimming tool carried by said frame and constructed and arranged to permit the tool to be swung into operative engagement with the hob tooth flanks to be trimmed or out of engagement and remotely disposed with respect to the hob.

4. A machine for dressing threaded conical abrasive tools of the type used in producing spiral bevel gears, said machine comprising a support; a threaded tool of abrasive material rotatably mounted on said support; a dressing tool movably mounted on said support and capable of swinging movement into and out of contact with the flanks of the threads on said tool; and means for oscillating said dressing tool on said thread flanks in a direction oblique to their direction of rotation when the dressing tool is in contact with the same.

5. A machine for dressing threaded conical abrasive tools of the type used in producing spiral bevel gears, said machine comprising a support; a threaded tool of abrasive material rotatably mounted on said support; a threaded spindle rotatably mounted on said support; a dressing tool having one end in threaded engagement with said spindle; means for rotating said spindle to impart a displacing movement to said dressing tool along said abrasive tool; mounting means for said dressing tool to permit swinging movement of the same into and out of contact with the flanks of the threads on the abrasive tool; and means for oscillating said dressing tool on said thread flanks when the dressing tool is in contact with the same.

6. A machine for dressing threaded conical abrasive tools of the type used in producing spiral bevel gears, said machine comprising a support; a threaded tool of abrasive material rotatably mounted on said support; means for adjusting said abrasive tool longitudinally in its support to compensate for variations in its diameter as it is dressed; a dressing tool movably mounted on said support and capable of swinging movement into and out of contact with the flanks of the threads on said tool; and means for oscillating said dressing tool on said thread flanks in a direction oblique to their direction of rotation when the dressing tool is in contact with the same.

7. A machine for shaping conical abrasive tools having cutting teeth arranged on their peripheries for producing spiral bevel gears, said machine comprising a support; a hollow shaft rotatably mounted in said support; a threaded hob of abrasive material having a spindle extending through said hollow shaft; an adjustable connection between said hollow shaft and said spindle to permit longitudinal movement of said spindle in said hollow shaft; means for locking said spindle to said shaft to cause the two to rotate together in predetermined adjusted relation; a trimming tool; means for mounting said trimming tool in said support to permit swinging movement of said tool into and out of engagement with the thread flanks of said abrasive tool; and means for oscillating said trimming tool on said thread flanks in a direction oblique to their direction of rotation when the trimming tool is in contact with the same.

HEINRICH SCHICHT.